F. H. NEWLOVE.
MILKING PAIL.
APPLICATION FILED NOV. 8, 1909.

954,129.

Patented Apr. 5, 1910.

Witnesses

Inventor
Frank H. Newlove.
By C. A. Snow & Co.
Attorneys

UNITED STATES PATENT OFFICE.

FRANK HENRY NEWLOVE, OF CORNING, KANSAS.

MILKING-PAIL.

954,129.  Specification of Letters Patent.  Patented Apr. 5, 1910.

Application filed November 8, 1909. Serial No. 526,842.

*To all whom it may concern:*

Be it known that I, FRANK HENRY NEWLOVE, a citizen of the United States, residing at Corning, in the county of Nemaha and State of Kansas, have invented a new and useful Milking-Pail, of which the following is a specification.

It is the object of this invention to provide a milking pail so constructed that it will be impossible for filth of any sort to find its way within the pail, thereby contaminating the milk.

With this end in view, the object of the invention is to provide a milking pail having a spout adapted to serve as a discharge for the milk, and to provide movable, foraminous means for closing the spout.

Another object of the invention is to provide a hinged lid for the pail, of novel and improved construction and to assemble a funnel therewith, adapted to receive the milk as it is poured into the pail, the funnel being so constructed that it is adapted to receive, removably, a screen, whereby the milk may be strained before it is poured into the pail.

With these and other objects in view, as will hereinafter more fully appear, the invention consists in the novel construction and arrangement of parts hereinafter described, delineated in the accompanying drawings, and particularly pointed out in that portion of this instrument wherein patentable novelty is claimed for certain distinctive features of the device, it being understood, since the drawings show preferred embodiments merely, changes, properly falling within the scope of what is claimed, may be made, without departing from the spirit of the invention.

Similar numerals of reference are employed to denote corresponding parts throughout the several figures of the drawings, wherein:—

Figure 1:
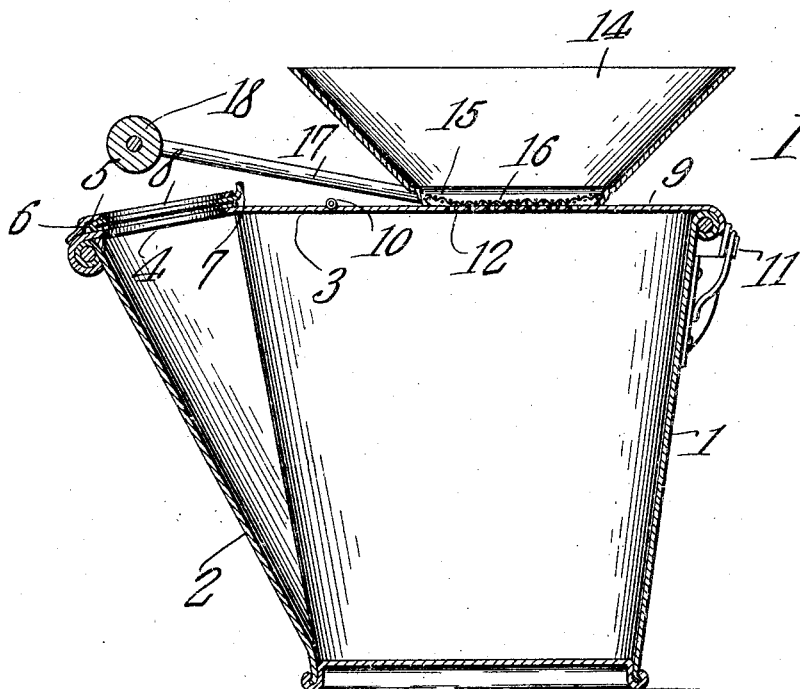
Figure 2:
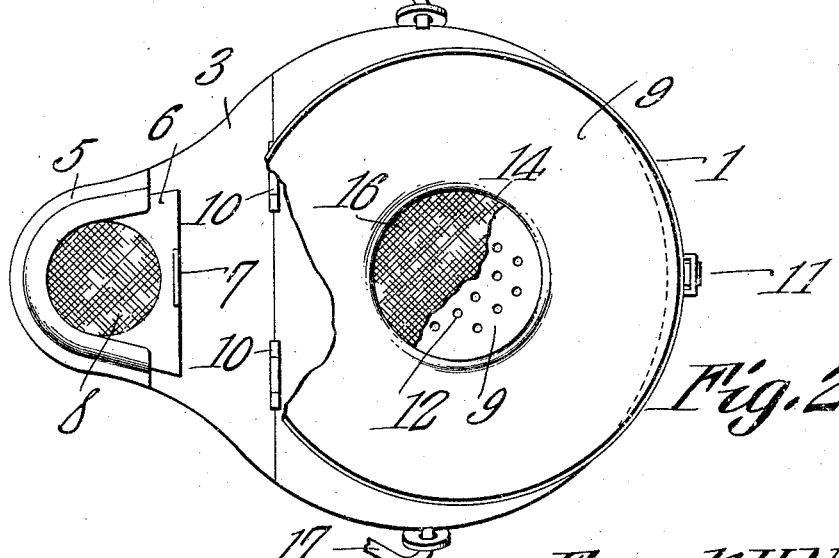

Figure 1 is a vertical section; and Fig. 2 is a top plan, parts being broken away.

In carrying out the invention, there is provided, as a fundamental element of the structure, a pail 1. This pail may be of any form adapted to the exigencies of the particular case, and I wish to bind myself to no specific form of pail, it being understood that the showing of the drawing in this respect may be freely departed from without impairing the utility of the device. The pail 1 is provided with a longitudinally disposed spout 2, terminating flush with the rim of the pail.

A plate 3 is secured to the rim of the pail 1, and this plate 3 extends over the spout 2, to the periphery thereof, with which it is assembled, the plate 3 being provided with an opening 4 communicating with the spout 2. Mounted upon this plate 3 and extending around the periphery of the spout 2, upon either side, to the point of union between the spout 2 and the pail 1, is an overhanging guide 5, beneath which is adapted to be inserted a plate 6, slidably, the plate 6 being provided with an opening over which extends a foraminous member 8, a piece of wire netting of small mesh, or the like. At its inner end, the plate 6 is provided with an upstanding lip 7 for the manipulation of the plate.

Hinged at 10, in any suitable manner, to the edge of the plate 3, is the cover 9 of the pail, the same being secured to the rim of the pail by means of a catch 11. This cover 9 is provided with a plurality of perforations 12, adapted to strain the milk as it is poured into the pail. Surrounding the perforations 12 in the cover 9, and secured to the cover 9, is a funnel 14, provided, adjacent its lower end, with a circumscribing, inwardly extending rib 15. Beneath this rib is adapted to be inserted, to rest upon the cover 9, a screen 16, which, if desired, may, like the screen 8, be fashioned from wire netting of small mesh. Assembled with the pail 1 is a bail 17, provided with a handle 18.

From the foregoing it will be seen that I have provided a milking pail of sanitary construction, adapted to exclude all dirt from the milk, while the milk is being poured into the pail, and, at the same time, adequately to protect the milk after the same has entered the pail.

The funnel enters the cover of the pail at some distance from the rim of the pail, and, should the pail be accidentally turned over, it can ordinarily be upturned before any considerable amount of the milk within the pail has been spilled.

If desired, the screen 16 may be dispensed with, the milk in such case, being strained through the perforations 12. When the screen 16 is employed, the position of the portion of the cover beneath the screen, will serve to uphold the screen, without materially stopping the flow of milk into the pail, it being understood that the screen 16 may be readily sprung into position beneath the rib 15, or removed therefrom for cleaning.

By referring to Fig. 1 of the drawings, it will be seen that the screen 16 is bulged downwardly in its central portion, to rest upon the cover of the pail, the periphery of the screen upstanding away from the cover. The rib 15 of the funnel 14 is rounded in transverse section. This rib 15 serves, not only, as hereinbefore stated, as a means for retaining the screen 16 in place, but, as well, as a means for deflecting the contents of the funnel upon the downwardly bulged central portion of the screen. As the milk flows down the inclined wall of the funnel 14, the rib 15 will serve to deflect the milk toward the central portion of the screen, thus preventing the milk from flowing between the periphery of the screen and the inclined wall of the funnel.

Having thus described the invention what is claimed is:—

A device of the class described consisting of a pail; a funnel; a cover for the pail extended beneath the funnel and to which the lower extremity of the funnel is secured, the cover being provided, within the contour of the funnel, with a plurality of perforations; and a screen located within the funnel and bulged downwardly in its central portion to rest upon the cover; the funnel being provided in its inclined wall, with a circumscribing, transversely rounded rib, constituting at once, a means for engaging the periphery of the screen to hold the bulged portion thereof upon the cover, and a means for deflecting the contents of the funnel upon the bulged portion of the screen.

In testimony that I claim the foregoing as my own, I have hereto affixed my signature in the presence of two witnesses.

FRANK HENRY NEWLOVE.

Witnesses:
L. S. SLOCUM,
EMMA WILLIAMS.